United States Patent [19]

Soohoo

[11] Patent Number: 5,621,624
[45] Date of Patent: Apr. 15, 1997

[54] MINIATURIZED HIGH FREQUENCY DIRECT CURRENT POWER SUPPLY

[76] Inventor: Ronald F. Soohoo, 568 Reed Dr., Davis, Calif. 95616

[21] Appl. No.: 298,002

[22] Filed: Aug. 30, 1994

[51] Int. Cl.$^6$ .................................................. H02M 3/335
[52] U.S. Cl. .................... 363/21; 363/8; 363/86
[58] Field of Search .................... 323/266; 363/8, 363/21, 124, 126, 127, 86

[56] References Cited

U.S. PATENT DOCUMENTS

| | | |
|---|---|---|
| 3,614,554 | 10/1971 | Ramsey . |
| 4,519,024 | 5/1985 | Federico et al. .......................... 363/127 |
| 5,355,301 | 10/1994 | Saito et al. ............................ 363/21 X |

OTHER PUBLICATIONS

Soohoo, R.F. (1979) "Magnetic Thin Film Inductors For Integrated Circuit Applications", *IEEE Transactions on Magnetics*, Mag–15(6):1803–1805.

Primary Examiner—Peter S. Wong
Assistant Examiner—Y. J. Han
Attorney, Agent, or Firm—Townsend and Townsend and Crew LLP

[57] ABSTRACT

A power supply is disclosed which is compatible with modern thin film technology which has an overall size compatible with modern miniaturized electronic components. Input power having an oscillating component in the 50/60 Hz 120/220 volt range is immediately switched to high frequency current exceeding 100 KHz and preferably switched with a frequency in the megahertz range. The switched current, otherwise unaltered from its current having an oscillating component, is then transduced in voltage at a thin film transformer, passed through thin film mounted electronic components for rectification and filtering. A regulator circuit modifies the semi-conductor switch duty cycle to control the rectifier output voltage. All transformer, rectifier, and filter components are of thin film variety and mounted to attain efficient heat dissipation together with size reduction comparable to the powered components driven by the power supply.

6 Claims, 2 Drawing Sheets

MINIATURIZED HIGH FREQUENCY DIRECT CURRENT POWER SUPPLY

This invention relates to the miniaturization of power supplies for producing direct current. More particularly, a power supply is disclosed in which incoming current having an oscillating component in the range of 50/60 Hz is immediately converted to high frequency switched current in the megahertz range and thereafter rectified utilizing electronic components of the thin film variety. This approach drastically reduces the size of a power supply to a point whereby it can be in the form of a plug-in, a card, or an IC chip for use in a computer, cellular telephone, and telecommunication industries.

BACKGROUND OF THE INVENTION

Electronic components continue to be reduced in size. Unfortunately, direct current power supplies for such electronic components have not undergone such size reductions. Specifically, it is now common for small portable electronic components such as portable computers to have accompanying power supplies that are substantial in size and weight comparable to the portable computers themselves.

Conventional power supplies that rectify 50/60 Hertz 120/220 volt alternating current into direct current are particularly large. Such devices usually include full wave or half wave rectifiers which produce direct current still having the "ripple" of the originating alternating current. Thereafter, this ripple in the rectified current is substantially eliminated by appropriate electronic circuitry, such as a capacitance and inductance, to produce the required stable direct current.

Unfortunately, such conventional power supplies involved low frequencies and long wave lengths. These low frequencies and long wave lengths lead to high power losses. Almost everyone using such devices is familiar with the "warm" feeling that such large rectification devices have after continued use. Further, such components have large size. They either occupy a substantial volume of the devices which they power or alternatively constitute large stand alone components which reside outside of the units which they power.

In an effort to further reduce size, so-called switched mode power supplies have been utilized. These devices include a low frequency rectifier and relatively crude filter. The total power from this low frequency rectifier and filter is then routed to a semiconductor switch. With the semiconductor switch, the rectified power is then converted to high frequency switched power which is thereafter rectified.

These switched power supplies generally operate with their switching transistors operating in the kilohertz range —typically below 40 KHz. While the ultimate rectification that they can produce is superior, and the rectifying components of such power supplies are somewhat smaller, they frequently are not equivalent in size to the components that they serve. For example, the average "notebook computers" single largest component is the power supply. It is almost always, external to the remainder of the computer and rather bulky relative to that computer.

SUMMARY OF THE INVENTION

A power supply is disclosed which is compatible with modern thin film technology which has an overall size compatible with modern miniaturized electronic components. Input power having an oscillating component in the 50/60 Hz 120/220 volt range is immediately switched to high frequency current exceeding 100KHz and preferably switched with a frequency in the megahertz range. The switched current, otherwise unaltered from its current having an oscillating component, is then transduced in voltage at a thin film transformer, passed through thin film mounted electronic components for rectification and filtering. A regulator circuit modifies the semi-conductor switch duty cycle to control the rectifier output voltage. All transformer, rectifier, and filter components are of thin film variety and mounted to attain efficient heat dissipation together with size reduction comparable to the powered components driven by the power supply.

It is to be noted that over the prior art, several distinctions are present.

First, by feeding the 110/220 volt, 60 Hertz supply directly to a semiconductor switch section, the bulky low frequency rectifier/filter section of prior art power supplies is eliminated.

Second, by going to the megahertz range of semiconductor switching directly—and omitting the initial crude rectification stage common to most switching power supplies— the high frequency supply is reduced to "card compatible size" as small as a single I.C. chip. For the first time, power supplies have a size that is compatible with the components which they serve.

Third, thin film technology can be used for transformer, rectification and filtering components of the invention. As a result, required heat dissipation of the smaller rectification device is easily accommodated.

DESCRIPTION OF THE PREFERRED EMBODIMENT

Figure 1:
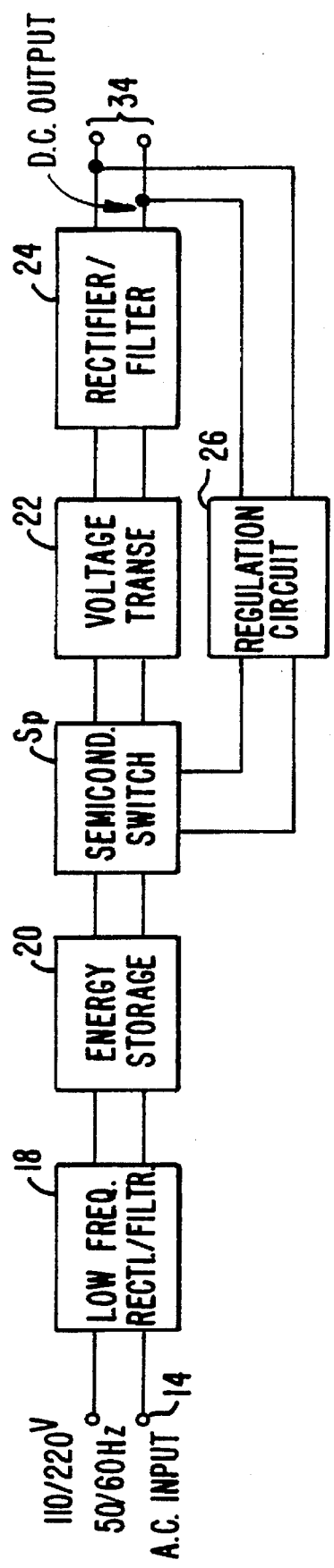
FIG. 1 is a block diagram of a prior art conventional switched mode power supply having an initial crude rectification followed by a semiconductor switch, transformer, and rectifier/filter.

Referring to FIG. 1, a conventional switched power supply of the prior art is illustrated. A.C. input 14 provides power to be rectified. This current then passes through low frequency rectifier/filter 18 and then to energy storage device 20. In the conventional switched power supply of the prior art, switching at semi-conductor switch $S_P$ is then provided, usually in a range below 40 KHz. Voltage is conventionally transduced at transformer 22 to the desired voltage for conventional rectifier 24. Rectified current leaves power supply output 34. As is common, the duty cycle of semi-conductor switch $S_P$ is controlled through regulator circuit 26 which continually monitors the switched power supplies output.

In the switched power supply, it will be observed that an attempt is first made to rectify the current when the current is still in the 50/60 Hz range. This initial rectification requires large wave components because of long wave lengths. In what follows, I take the step of immediately switching to high frequency—above 100 KHz and preferably in the Mega Hz range. This immediate switching to higher frequencies is believed to be in the opposite direction of conventional power supplies. However, the high frequency produced makes the remainder of the processing possible utilizing miniaturized components.

Figure 2:
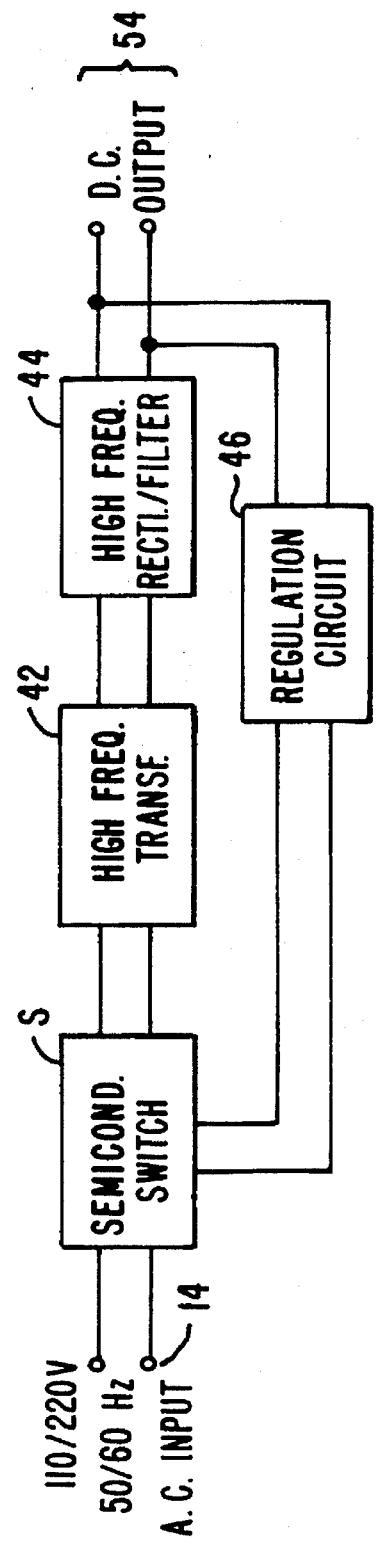
FIG. 2 is a block diagram of the improved power supply of this invention having the semiconductor switch directly switch the incoming power to the megahertz range followed by thin film transformer, rectifier/filter circuit monitored by a thin film regulator circuit with duty cycle control of the semiconductor switch; and, FIG. 3 is a schematic of a exemplary regulator circuit suitable for the high frequency power supply of this invention.

Referring to FIG. 2, a diagram of the invention herein is set forth. A.C. input 14 includes current having a substantial 50/60 Hz oscillating component. While it is not necessary that the rectified current of this invention have true alternating current format, the invention is designed for the power supply to be powered utilizing current having 50/60 Hz oscillating component or harmonics of this frequencies.

Upon entry into the power supply, immediate switching at semi-conductor switch S occurs. Such switching takes the current to a switched frequency exceeding 100 KHz and preferably to the Mega Hz range. Thereafter, current flow includes high frequency voltage transformer 42 and high frequency voltage rectifier/filter 44. As will hereafter be developed, these circuits because of the high frequencies involved can be quite small. Thereafter, power supply output 54 provides current while high frequency regulator 46 controls voltage output by controlling semi-conductor switch S duty cycle.

Figure 3:
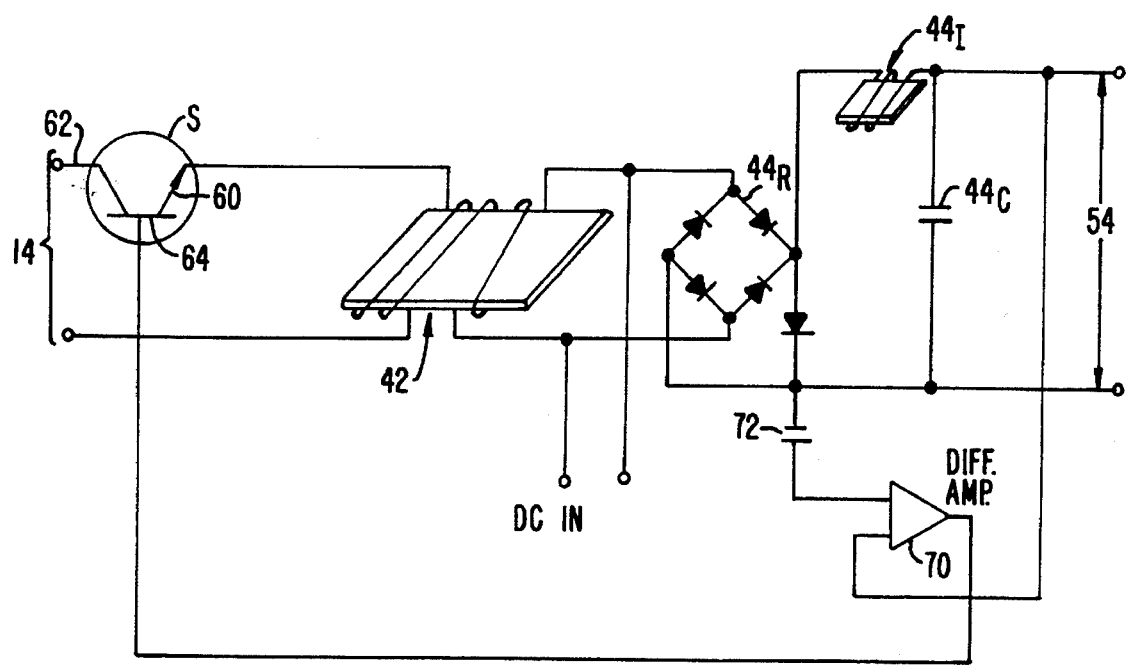

Referring to FIG. 3, semi-conductor switch S is shown with sink 62, gate 64, and source 60. As can be understood, duty cycle at gate 54 is modified through a requlator circuit including differential amplifier 70 and reference voltage 72, both of which can be thin film mounted because of the high frequencies involved.

High frequency voltage transformer 42 is schematically shown and is of the thin film variety. Such devices are described and set forth in *Magnetic Thin Film Inductor for Integrated Circuit Applications* by myself in IEEE Transactions on Magnetics, Vol. Mag. 15, No. 6, November 1979 on pages 1803–1805.

Once voltage is transduced, it then passes to high frequency rectifier $44_R$ and thereafter to high frequency inductor $44_I$, and high frequency capacitor $44_C$ all of which are thin film mounted.

A word can be added about that power required to drive semi-conductor switch S. Specifically, semi-conductor switch S is only given sufficient power to drive the switching function. Unlike switches of the prior art, input of low frequency rectified current is not utilized to drive the switching circuit. I generally prefer feed back rectified power from output 54 to drive semi-conductor switch S. Alternately, sufficient current to start switching can be provided from either a small direct current source such as battery or alternatively from a low level rectifier having sufficient current to power switching only.

Regarding the utility of this invention, some comparisons may be useful. In the following table, I give the relative power supply sizes of the prior art of FIG. 1 compared to the preferred embodiment of FIG. 3.

TABLE I

Power Supply Size Comparisons

| Component Type | Typical or Estimated Volume (in Cubic Inches) |
|---|---|
| P.C. Computer Power Supply | 215 |
| Notebook Computer Power Supply | 37 |
| Plugin Power Supply* | 12 |
| Card Power Supply* | 6 |
| I.C. Power Supply* | 0.3 |

*Underlying this invention.

What is claimed is:

1. A rectifier for receiving current having an oscillating component in a range of 50/60 Hertz and out putting direct current comprising in combination:

a direct current driven semiconductor switch connected to the current having an oscillating component in the range of 50/60 Hertz and operative to switch the current having an oscillating component to produce switched current having a frequency exceeding 100 kilohertz;

a high frequency transformer for producing from the switched current having a frequency exceeding 100 kilohertz a voltage suitable for rectification;

a high frequency rectifier for producing direct current from transformer;

a filter circuit for filtering the direct current from the high frequency rectifier to produce a direct current output from the rectifier; and, a regulator connected to the semiconductor switch having direct current sufficient to drive the semiconductor switch.

2. A rectifier for receiving current having an oscillating component in the range of 50/60 Hertz and out putting direct current according to claim 1 and wherein:

the direct current sufficient to drive the semiconductor switch comprises a feedback connection from the direct current output.

3. A rectifier for receiving current having an oscillating component in the range of 50/60 Hertz and out putting direct current according to claim 1 and wherein:

the high frequency transformer is a thin film transformer.

4. A rectifier for receiving current having an oscillating component in the range of 50/60 Hertz and out putting direct current according to claim 1 and wherein:

the high frequency rectifier is a thin film rectifier.

5. A rectifier for receiving current having an alternating component in the range of 50/60 Hertz and out putting direct current according to claim 1 and wherein:

the filter circuit for filtering the direct current from the high frequency rectifier filter is a thin film filter.

6. A process for receiving current having an alternating component in a range of 50/60 Hertz and out putting direct current comprising the steps of:

providing a direct current driven semiconductor switch connected to the current having the alternating component in the range of 50/60 Hertz;

switching the current having an alternating component in the range of 50/60 Hertz to produce switched current having a frequency exceeding 100 kilohertz;

providing and connecting a high frequency transformer for producing from the switched current having a frequency exceeding 100 kilohertz a voltage suitable for rectification;

providing and connecting a high frequency rectifier for producing direct current from the switched current having a frequency exceeding 100 kilohertz;

providing and connecting a filter circuit for filtering the direct current from the high frequency rectifier to produce a direct current output from the rectifier; and, providing to the semiconductor switch a direct current power source to the semiconductor switch having power sufficient to drive the semiconductor switch.

* * * * *